United States Patent
Rosa et al.

(10) Patent No.: US 12,554,759 B2
(45) Date of Patent: Feb. 17, 2026

(54) RECOMMENDATION GENERATION USING USER INPUT

(71) Applicant: Microsoft Technology Licensing, LLC, Redmond, WA (US)

(72) Inventors: Arthur J. Rosa, Sunnyvale, CA (US); Anil Kumar Ravindra Mallapur, Sunnyvale, CA (US); Vishal Chandawarkar, San Francisco, CA (US); Zihua Liu, Sunnyvale, CA (US); Hyunwoo Park, San Jose, CA (US); Jeffery B. Sturgis, Santa Cruz, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/506,039

(22) Filed: Nov. 9, 2023

(65) Prior Publication Data

US 2025/0156463 A1   May 15, 2025

(51) Int. Cl.
*G06F 16/00* (2019.01)
*G06F 16/334* (2025.01)
*G06F 16/3349* (2025.01)

(52) U.S. Cl.
CPC ...... *G06F 16/3349* (2019.01); *G06F 16/3344* (2019.01)

(58) Field of Classification Search
CPC .......................... G06F 16/3349; G06F 16/3344
See application file for complete search history.

(56) References Cited

U.S. PATENT DOCUMENTS

| | | | |
|---|---|---|---|
| 2019/0197158 A1* | 6/2019 | Firooz | G06F 16/313 |
| 2020/0394539 A1* | 12/2020 | Sethre | G06N 5/04 |
| 2020/0394615 A1* | 12/2020 | Sethre | G06Q 10/1053 |
| 2024/0112103 A1* | 4/2024 | Sheinberg | G06Q 10/1053 |
| 2024/0129601 A1* | 4/2024 | Brdiczka | H04N 21/854 |
| 2024/0289361 A1* | 8/2024 | Batina | G06F 16/3328 |
| 2025/0124371 A1* | 4/2025 | Masood | G06Q 10/063112 |

* cited by examiner

*Primary Examiner* — Syed H Hasan
(74) *Attorney, Agent, or Firm* — Nicholson De Vos Webster & Elliott LLP

(57) ABSTRACT

Methods, systems, and apparatuses include receiving text input via a user interface for an online system. An embedding is generated based on the text input. Supplemental text is generated using the embedding and a vector store including a standardized content items, the supplemental text having a standardized format. The standardized content items are generated by applying a large language model to a plurality of content items. A prompt is formulated including the supplemental text. A generative language model is applied to the prompt. A recommendation is output by the generative language model based on the prompt. The recommendation is provided to the user interface based on at least the text input.

20 Claims, 10 Drawing Sheets

What kind of job are you looking for?

You can select up to 5 titles and locations.

Job titles °

[ Ex: Sales Manager ]

Job locations°

[ Ex: CityName1, StateName1 ]

I'm open to remote work

I'm not sure

( Next )

FIG. 6

Get job ideas based on your interests

Tell us more about what you want to do.

Examples:
• I like fashion and want to design clothes.
• I am a nurse and want to work at a hospital near me.

Your response is private to you.  0/200

Next

Skip

FIG. 7

Get job ideas based on your interests

Tell us more about what you want to do.

I want to help people in CountryName1

Your response is private to you.  37/200

Next

Skip

FIG. 8

Here are some suggested job titles and locations

You can select up to 5 titles and locations.

Job titles
- Community Outreach Manager ×
- Education Program Manager ×
- Leadership Development Manager ×
- + Add title Job locations
- CityName2, StateName2, CountryName1 ×
- CityName3, StateName3, CountryName1 ×
- CityName4, StateName4, CountryName1 ×
- CityName5, StateName5, CountryName1 ×
- CityName6, StateName6, CountryName1 ×
- + Add location ☐ I'm open to remote work

[ Next ]

RECOMMENDATION GENERATION USING USER INPUT

TECHNICAL FIELD

The present disclosure generally relates to machine learning models, and more specifically, relates to generating input for content generation for machine learning models.

BACKGROUND ART

Machine learning is a category of artificial intelligence. In machine learning, a model is defined by a machine learning algorithm. A machine learning algorithm is a mathematical and/or logical expression of a relationship between inputs to and outputs of the machine learning model. The model is trained by applying the machine learning algorithm to input data. A trained model can be applied to new instances of input data to generate model output. Machine learning model output can include a prediction, a score, or an inference, in response to a new instance of input data. Application systems can use the output of trained machine learning models to determine downstream execution decisions, such as decisions regarding various user interface functionality.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 illustrates another example graphical user interface in accordance with some embodiments of the present disclosure.

FIG. 7 illustrates another example graphical user interface in accordance with some embodiments of the present disclosure.

FIG. 8 illustrates another example graphical user interface in accordance with some embodiments of the present disclosure.

DETAILED DESCRIPTION

Figure 1:
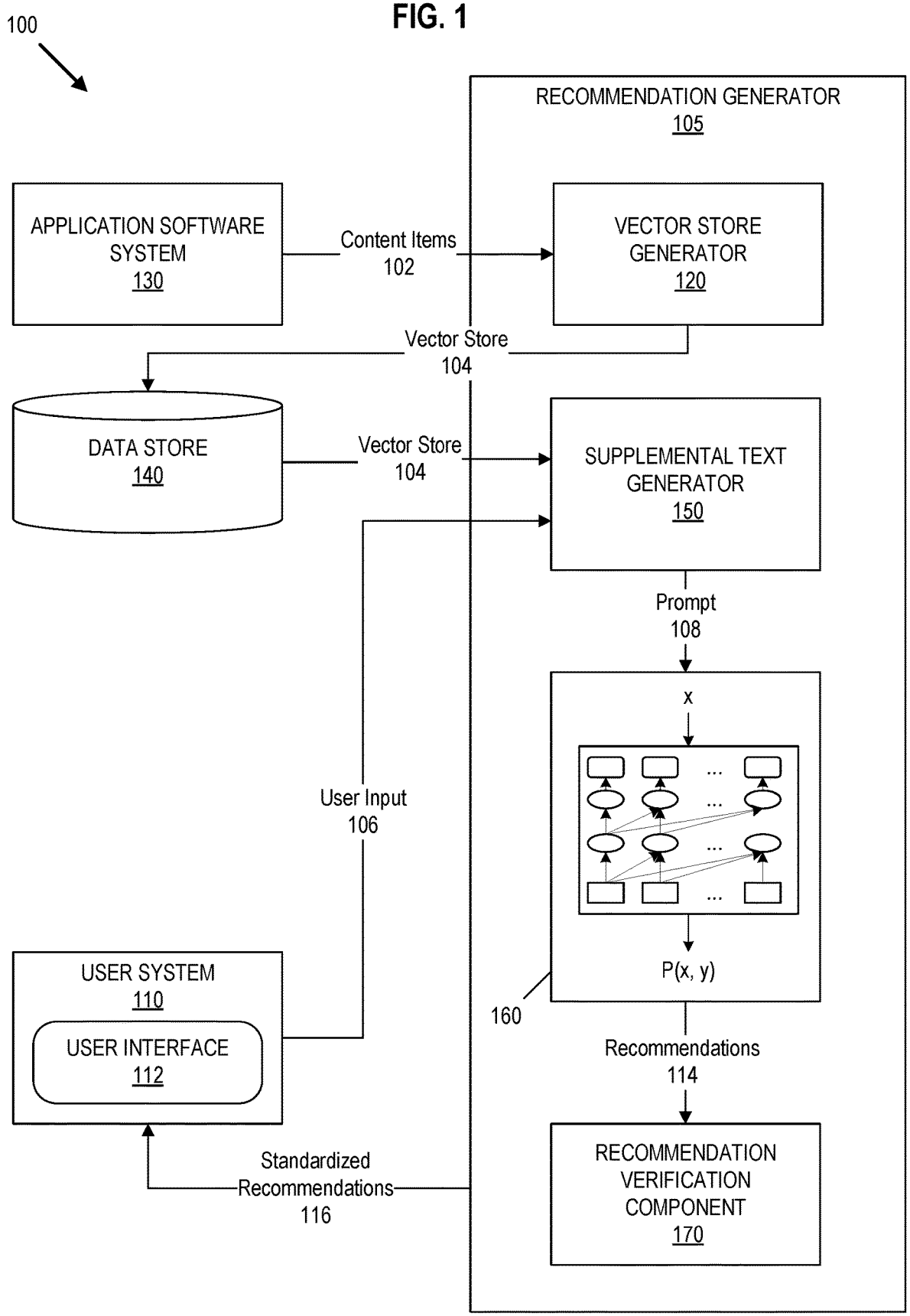
FIG. 1 illustrates an example recommendation generation system that includes a recommendation generator in accordance with some embodiments of the present disclosure.

A generative model uses artificial intelligence technology to machine-generate new digital content based on model inputs and the data with which the model has been trained. Whereas discriminative models are based on conditional probabilities P (y|x), that is, the probability of an output y given an input x (e.g., is this a photo of a dog?), generative models capture joint probabilities P(x, y), that is, the likelihood of x and y occurring together (e.g., given this photo of a dog and an unknown person, what is the likelihood that the person is the dog's owner, Sam?).

A generative language model generates new text in response to model input. The model input includes a task description, also referred to as a prompt. The task description can include an instruction and/or an example of digital content. A task description can be in the form of natural language text, such as a question or a statement, and can include non-text forms of content, such as digital imagery and digital audio. Given a task description, a generative model can generate a set of task description-output pairs, where each pair contains a different output, and assign a score to each of the generated task-description-output pairs. The output in a given task description-output pair contains text that is generated by the model rather than provided to the model as an input.

The score associated by the model with a given task description-output pair represents a probabilistic or statistical likelihood of there being a relationship between the output and the corresponding task description in the task description-output pair. For example, given an image of an animal and an unknown person, a generative model could generate the following task description-output pairs and associated scores: [what is this a picture of?; this is a picture of a dog playing with a young boy near a lake; 0.9], [what is this a picture of?; this is a picture of a dog walking with an old woman on a beach; 0.1]. The higher score of 0.9 indicates a higher likelihood that the picture shows a dog playing with a young boy near a lake rather than a dog walking with an old woman on a beach. The score for a given task description-output pair is dependent upon the way the generative model has been trained and the data used to perform the model training. The generative model can sort the task description-output pairs by score and output only the pair or pairs with the top k scores, where k is a positive integer. For example, the model could discard the lower-scoring pairs and only output the top-scoring pair as its final output.

Machine learning models have many potential uses. However, there are shortcomings that present technical challenges to the widespread use of machine learning models for generating new content. For example, machine learning models for generating new content require a high quality of prompts to ensure that the model output is relevant to the desired task and to ensure that the output provides the desired content in a preferred format.

Additionally, some machine learning models have limits on the length or size of the inputs (e.g., data included in the task description) that the models can receive or otherwise constrain the input parameter values. These limits can impact the quality of the model output, particularly if the task description is not well-designed. Quality as used herein may refer to an objective determination such as a machine-determined difference between an expected model output and an actual model output, which also may be referred to as loss. In conventional systems, determining what constitutes a well-designed task description is a trial-and-error process involving a human formulating task descriptions, observing model outputs, and modifying the task descriptions based on the model outputs. Further, training a machine learning model is a resource intensive process that involves time-consuming human experimentation to generate training data and requires subject matter expertise to configure the model architecture and hyperparameters to produce reliable output for real world tasks.

The shortcomings of machine learning models are particularly acute when the models are tasked with generating task specific content and content that operates under a preexisting taxonomy. These conventional models fail to generate outputs that operate within the taxonomy or rely heavily on pre-publication and post-publication editing by human reviewers. Taxonomy as used herein may refer to the system classification and sorting of data for a specific domain. Conventional models, in particular, struggle to generate outputs for the preexisting taxonomy when the prompt does not adhere to the taxonomy. This shortcoming is due, in part, to the generalized nature of the data used to train the models. For example, conventional models are not trained on domain specific data and/or data that is relevant in specific domains.

Conventional models also struggle to generate outputs that adhere to taxonomies that are limited. For example, taxonomies that are generated through intensive processes, such as manual labeling, and are therefore limited in their breadth may not map accurately to input prompts. In such situations, conventional models struggle to generate outputs that adhere to these limited taxonomies.

Furthermore, conventional models tend to suffer from hallucination and relevancy problems. For example, conventional models can hallucinate as a result of poorly formatted and/or sparse user input, leading to made-up and inaccurate results. Similarly, conventional models that are fed these poorly formatted and/or sparse prompts may generate irrelevant results.

A recommendation generation system using user input as described herein includes a number of different components that alone or in combination address the above and other shortcomings of the conventional machine learning model technologies, particularly when applied to the machine generation of domain specific data, such as recommendations for content under a preexisting taxonomy. For example, by utilizing domain specific data for a preexisting taxonomy, the recommendation generation system can translate user input into a form operating under the taxonomy while adding content to the user input for the desired domain. For example, the recommendation generation system can take poorly formatted, sparse user input, and/or user input that is not accurate to the user's intentions, and alter the user input to include more details and domain-specific knowledge producing a prompt that, when input into a generative machine learning model, generates recommendations that are relevant to the domain and are interpretable under the preexisting taxonomy. Users of the recommendation generation system, therefore, do not need to have knowledge of the taxonomy, such as the correct input keywords, in order to receive quality recommendations. Additionally, the recommendation generation system can leverage categories of the preexisting taxonomy to generate recommendations that are highly relevant to the user without the user having to produce high quality prompts themselves. For example, the recommendation generation system can use a language of the user input to generate a prompt that indicates an output should apply for a specific geographic region, resulting in a geographic region-specific recommendation without any explicit input by the user. Furthermore, the recommendation generation system can check the recommendations using knowledge of the preexisting taxonomy to prevent hallucinations and/or irrelevant recommendations. As described in more detail below, the recommendation generation system described includes a recommendation generator.

FIG. 1 illustrates an example of a recommendation generation system for generating recommendations using user input in accordance with some embodiments of the present disclosure.

In the example of FIG. 1, a recommendation generation system 100 includes a recommendation generator 105, an application software system 130, a data store 140, and a user system 110. The recommendation generator 105 interfaces with one or more components of application software system 130 that create, edit, and store content items, network activity data, and related data. For example, in FIG. 1, content items 102 have been created and stored by an online system, such as a professional social network system or another type of application software system.

In some embodiments, content items 102 include information created and stored by an online system in response to inputs from users of the online system. In one embodiment, content items 102 include job postings by users of a professional social network system including content item categories. These categories may include, for example, a job title, an entity name, a job language, a job location, a job market area, a job industry, and skills associated with a job. In some embodiments, the various content items 102 and content item categories are unique to the social network system such that the recommendation generation system 100 that is in communication with the social network system is uniquely positioned and uniquely capable of generating digital content that is highly relevant, personalized, and effective for the users of the social network system.

Entity as used herein may refer to a user of an online system or another type of entity, such as a company or organization, a content item, or an attribute. For example, in a social networking application, entities can include a page with which a user of the online system can interact. For example, an entity could be a profile, a profile for a group of people, an organization profile, a job posting, etc. Activity as used herein may refer to network activity, such as digital communications between computing devices and systems. Examples of network activity include initiating a session with an online system by, e.g., logging in to an application, initiating a page load to load a web page into a browser, uploading, downloading, creating, and sharing digital content items on the network, and executing social actions, such as sending messages and/or adding comments or social reactions to articles or posts on the network.

Application software system 130 sends content items 102 to vector store generator 120 of recommendation generator 105. In some embodiments, as explained above, content items 102 include information created and stored by application software system 130 in response to inputs from users of the online system. For example, users of application software system 130 interact with application software system 130 causing application software system 130 to create content items 102.

In some embodiments, application software system 130 creates one or more content items of content items 102 in response to a user interacting with application software system 130 to create a job posting. In some embodiments, each of content items 102 include content item categories. As a nonlimiting example, these categories may include: a job title, an entity name, a job language, a job location, a job market area, a job industry, and skills associated with a job. In some embodiments, application software system 130 determines these categories based on input received from the user of application software system 130. For example, a user interacting with application software system 130 does not explicitly designate a job industry and application software system 130 determines the job industry based on the job title or entity name.

Vector store generator 120 receives content items 102 from application software system 130 and generates vector store 104. In some embodiments, vector store generator 120 generates vector store 104 by applying a large language model to content items 102 to create standardized content items. For example, vector store generator 120 uses a large language model to generate an embedding based on the semantic meaning of the text in each content item category for each content item of content items 102. In one embodiment, vector store generator 120 generates an embedding vector for the job title for a job posting. In some embodiments, vector store generator 120 generates a standardized content item by associating the embeddings generated for each content item category with the content item category. For example, vector store generator 120 generates a standardized content item as a matrix where each row of the matrix is an embedding vector for a different content item category. Further details with regards to generating vector store 104 and standardized content items are described with reference to FIG. 3.

Vector store generator 120 sends vector store 104 to data store 140. For example, vector store generator 120 stores the standardized content items in data store 140. In some embodiments, vector store generator 120 continually receives content items 102, generates vector store 104 and updates data store 140 accordingly. For example, in response to receiving a new job posting, application software system 130 sends a new content item for the new job posting to vector store generator 120. Vector store generator 120 generates a new standardized content item based on the new content item and stores the new standardized content item in data store 140.

Data store 140 receives and stores vector store 104 for future access. For example, data store 140 receives vector store 104 and stores vector store 104 for future access by supplemental text generator 150. Data store 140 can include any combination of different types of memory devices. Data store 140 stores digital data used by user system 110, application software system 130, vector store generator 120, supplemental text generator 150, generative language model 160, and recommendation verification component 170. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 220 of FIG. 2.

User system 110 sends user input 106 to supplemental text generator 150. For example, user system 110 generates user input 106 based on a user interacting with user interface 112 and sends user input 106 based on another user interaction with user interface 112. For example, with reference to FIG. 6, user system 110 generates user input 106 based on a user inputting text into text input interface 605 and sends user input 106 to supplemental text generator 150 in response to a user interacting with next button 610. In some embodiments, user input 106 is text input generated by user system 110 in response to a user interacting with user interface 112 to generate the text input. In some examples, the text input by the user is in an unstructured format.

Supplemental text generator 150 receives user input 106 and generates an embedding for user input 106. In some embodiments, supplemental text generator 150 generates the embedding based on content item categories (e.g., content item categories 312, 314, 316, 318, 320, and 322 of FIG. 3). For example, supplemental text generator 150 determines content item categories for the user input 106 and generates the embedding using the determined content item categories. In some embodiments, supplemental text generator 150 generates the embedding by applying a large language model to user input 106. For example, supplemental text generator 150 uses a large language model to generate an embedding based on the semantic meaning of the text input of user input 106. In some embodiments, supplemental text generator 150 applies the same large language model applied to generate the standardized content items of vector store 104. Supplemental text generator 150 generates supplemental text with a standardized format for user input 106 based on the embedding generated from user input 106 and vector store 104. Further details with regard to generating an embedding for user input 106 are discussed with reference to FIG. 4.

In some embodiments, supplemental text generator 150 generates supplemental text by performing a similarity search on the embedding generated from user input 106 and vector store 104. For example, supplemental text generator 150 performs a similarity search on the embedding generated from user input 106 to find entries in vector store 104 that are semantically similar to the text input of user input 106. Semantic similarity is a measure of the distance between the embeddings of two ideas in an embedded vector space. The more similar the two ideas, the less distance between the ideas in the embedded vector space and the less similar the two ideas, the more distance between the ideas in the embedded vector space. For example, the embeddings of two words like "cat" and "tiger" would be closer in the embedded vector space than two words like "cat" and "leprechaun." Various methods and data may be used for determining the embeddings and the measure of semantic similarity will depend on the embedding algorithm used. In some embodiments, supplemental text generator 150 determines a row of standardized content items of vector store 104 that is most semantically similar to the text input of user input 106. For example, supplemental text generator 150 determines a list of the most similar standardized content items of vector store 104 for the embedding.

In some embodiments, supplemental text generator 150 generates supplemental text including the list of standardized content items. For example, supplemental text generator 150 generates supplemental text including the content item category entries for the list of the most similar standardized content items. Further details with regard to generating supplemental text for user input 106 are discussed with reference to FIG. 4.

In some embodiments, supplemental text generator 150 generates supplemental text in response to a content item category of user input 106. For example, supplemental text generator 150 receives user input 106 in a specific language (e.g., Portuguese) and generates supplemental text comprising locations where the specific language is spoken (e.g., Portugal, Guinea-Bissau Mozambique, and Brazil).

Supplemental text generator 150 creates prompt 108 using the supplemental text. For example, in some embodiments, supplemental text generator 150 uses the supplemental text and a prompt template (e.g., prompt template 410 of FIG. 4) to create prompt 108. In some embodiments, supplemental text generator 150 generates the prompt template. In other embodiments, the set of instructions is predetermined and extracted from a data store (e.g., data store 140). The term prompt template as used in this disclosure can be a single instruction or multiple instructions.

In some embodiments, the prompt template includes text instructions instructing generative language model 160 to generate content. As a simple example, the prompt template may be "Return up to 5 relevant job titles and up to 5 relevant locations. The following is a list of jobs with different attributes like job location, industry, entity name, title, standardized title, and skills." In such an example, the prompt 108 includes the prompt template as well as the list of the most similar content items (e.g., supplemental text 408 of FIG. 4). Further details with regard to creating prompt 108 are discussed with reference to FIG. 4.

For each prompt 108, x, the generative language model 160 produces one or more outputs y and, for each output y, a score P(x, y) that indicates a likelihood of the prompt x and the respective output y occurring together. Using the output (s) y and corresponding score(s) P(x, y), the generative language model 160 generates recommendations 114. Recommendations 114 each include at least one piece of writing that has been machine-generated by the generative language model 160. For example, recommendations 114 include job titles and locations generated based on prompt 108.

In other words, output of the generative language model 160 can be customized for a particular user or user group of the online system based on the supplemental text that is used to generate the task descriptions (e.g., prompts) to which the generative language model 160 is applied. For example, a prompt can be configured based on job postings semantically similar to user input 106 so that the generative language model 160 generates job recommendations pertaining to user input 106. Recommendation generation system 100 can therefore reliably generate recommendations relevant to the internal taxonomy of vector store 104 without the user having knowledge of or referencing the internal taxonomy.

The generative language model 160 includes a deep learning model that is configured using artificial intelligence-based technologies to machine-generate natural language text. In some embodiments, generative language model 160 also or alternatively includes one or more generative models that are configured to machine-generate other forms of digital content, such as images, audio, video, etc. Thus, while the term generative language model can be used to refer to generative models that generate text, as used herein, a generative language model can include one or more components that generate non-text output or a combination of text and non-text output. In some examples, the deep learning model includes or is based on one or more generative transformer models, is based on one or more generative pre-trained transformer (GPT) models, one or more bidirectional encoder representations from transformers (BERT) models, one or more XLNET models, and/or one or more other natural language processing (NL) models. Examples of predictive neural models may include, but are not limited to, Generative Pre-Trained Transformers (GPT), BERT, and/or Recurrent Neural Networks (RNNs).

In some implementations, the generative language model 160 is constructed using a neural network-based machine learning model architecture. In some implementations, the neural network-based architecture includes one or more self-attention layers that allow the model to assign different weights to different words or phrases included in the model input. Alternatively, or in addition, the neural network architecture includes feed-forward layers and residual connections that allow the model to machine-learn complex data patterns including relationships between different words or phrases in multiple different contexts. In some embodiments, generative language model 160 includes at least three layers: an input layer that receives inputs (e.g., prompt 108), intermediate layers that process the input, and an output layer that outputs the generated content (e.g., recommendations 114) based on the input.

In some implementations, the generative language model 160 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the recommendation generation system 100.

In some embodiments, the generative language model 160 is trained on a large dataset of natural language text. The size and composition of the dataset used to train the generative language model 160 can vary according to the requirements of a particular design or implementation of the recommendation generation system 100. In some embodiments, generative language model 160 includes multiple generative language models trained on differently sized datasets. For example, generative language model 160 can include a high-capacity model (e.g., language generation model with a large number of parameters of non-constant values) used for generating examples as well as a low-capacity model (e.g., language generation model with a smaller number of parameters), which uses the examples from the high-capacity model to generate its own outputs.

In some embodiments, generative language model 160 is finetuned for a specific task. For example, generative language model 160 is trained using data including content items 102. Since generative language model 160 is finetuned using content items 102 including the content item categories, generative language model 160 is able to generate recommendations using the same taxonomy of content items 102. For example, generative language model 160 receives user input 106 and generates recommendations 114 with a taxonomy based on content items 102. Other examples of tasks are described with reference to FIG. 3.

In some embodiments, generative language model 160 generates recommendations 114 based on prompt 108 and existing content that generative language model 160 has been trained on. For example, generative language model 160 is trained on existing content to learn the probabilistic relationships between potential inputs and potential outputs such that generative language model 160 can determine outputs that are highly probable based on the input. As such, generative language model 160 generates recommendations 114 to address prompt 108 is a similar way as the existing content that generative language model 160 is trained on. Finetuning generative language model 160 based on specific existing content therefore allows generative language model 160 to conform to the standards and taxonomy of that content.

Generative language model 160 sends recommendations 114 to recommendation verification component 170. In some embodiments, generative language model 160 sends recommendations 114 to user system 110. In some embodiments, user system 110 includes job titles and job locations generated by generative language model 160 in response to prompt 108. In some embodiments, user system 110 receives and displays recommendation on user interface 112. Further details with regard to displaying recommendations 114 are discussed with reference to FIGS. 5-8.

In some embodiments, generative language model 160 sends recommendations 114 to recommendation verification component 170. Recommendation verification component 170 receives recommendations 114 and determines standardized recommendations 116 based on recommendations 114. For example, since recommendations 114 is generated by generative language model 160, there is a risk that recommendations 114 contains hallucinations, inaccurate, and/or inapplicable recommendations. Recommendation verification component 170 therefore determines standardized recommendations 116 by comparing recommendations 114 with a standardized list of possible outputs. For example, recommendation verification component 170 determines standardized recommendations 116 by comparing job title recommendations of recommendations 114 with a list of standardized job titles and determining standardized recommendations 116 as the standardized job titles that match recommendations 114.

Figure 2:
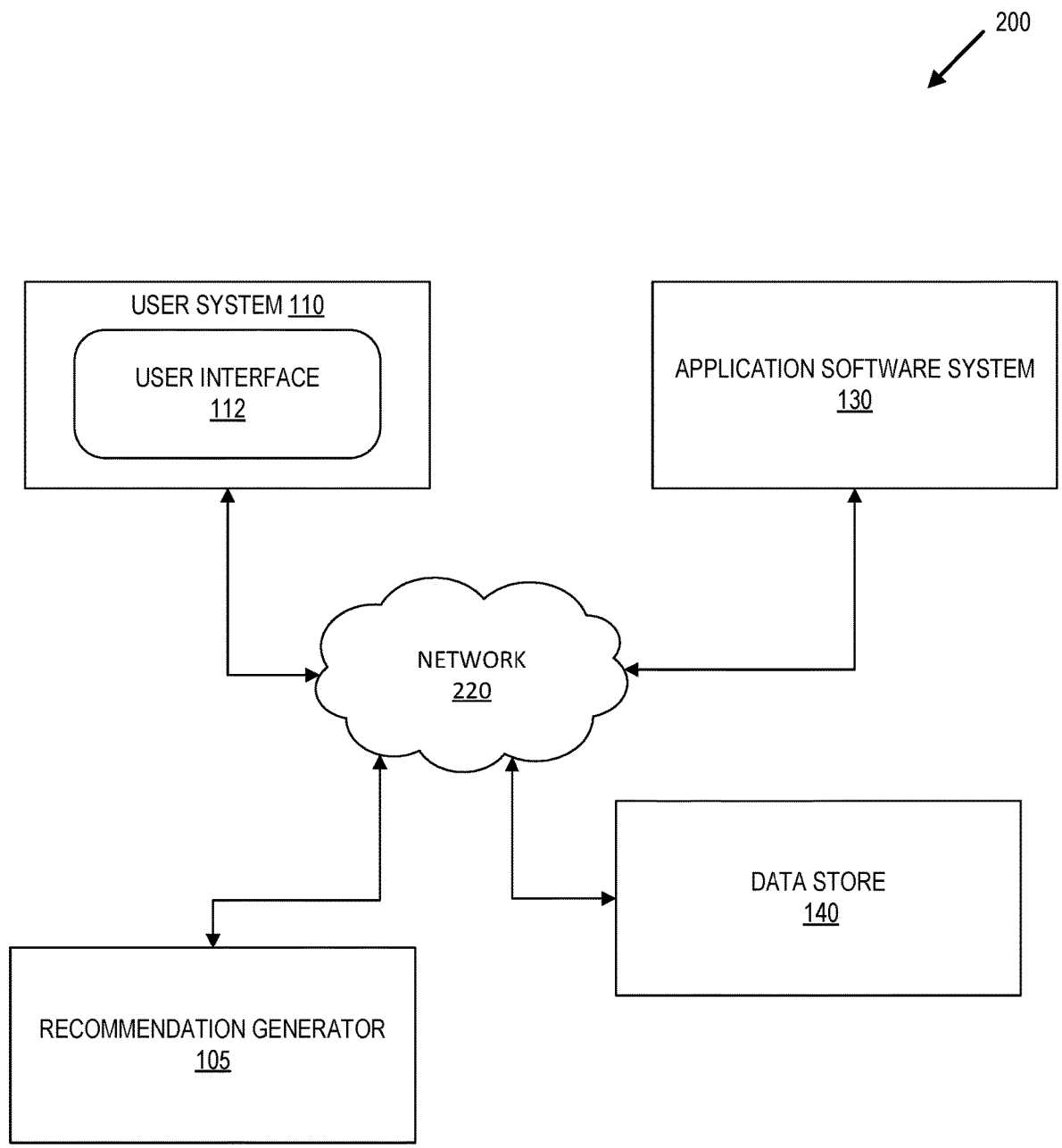
FIG. 2 illustrates another example recommendation generation system that includes a recommendation generator in accordance with some embodiments of the present disclosure.

In the embodiment of FIG. 2, computing system 200 includes a user system 110, a network 220, an application software system 130, a data store 140, and a recommendation generator 105. Each of these components of computing system 200 are described in more detail below.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs). Further details with regard to user interface 112 are disclosed with reference to FIGS. 5-8.

Network 220 can be implemented on any medium or mechanism that provides for the exchange of data, signals, and/or instructions between the various components of computing system 200. Examples of network 220 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that includes or utilizes functionality and/or outputs provided by recommendation generator 105. Examples of application software system 130 include but are not limited to online services including connections network software, such as social media platforms, and systems that are or are not be based on connections network software, such as general-purpose search engines, content distribution systems including media feeds, bulletin boards, and messaging systems, special purpose software such as but not limited to job search software, recruiter search software, sales assistance software, advertising software, learning and education software, enterprise systems, customer relationship management (CRM) systems, or any combination of any of the foregoing.

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

While not specifically shown, it should be understood that any of user system 110, application software system 130, data store 140, and recommendation generator 105 includes an interface embodied as computer programming code stored in computer memory that when executed causes a computing device to enable bidirectional communication with any other of user system 110, application software system 130, data store 140, and recommendation generator 105 using a communicative coupling mechanism. Examples of communicative coupling mechanisms include network interfaces, inter-process communication (IPC) interfaces and application program interfaces (APIs).

Each of user system 110, application software system 130, data store 140, and recommendation generator 105 is implemented using at least one computing device that is communicatively coupled to electronic communications network 220. Any of user system 110, application software system 130, data store 140, and recommendation generator 105 can be bidirectionally communicatively coupled by network 220. User system 110 as well as one or more different user systems (not shown) can be bidirectionally communicatively coupled to application software system 130.

A typical user of user system 110 can be an administrator or end user of application software system 130, and/or recommendation generator 105. User system 110 is configured to communicate bidirectionally with any of application software system 130, data store 140, and/or recommendation generator 105 over network 220.

The features and functionality of user system 110, application software system 130, data store 140, and recommendation generator 105 are implemented using computer software, hardware, or software and hardware, and can include combinations of automated functionality, data structures, and digital data, which are represented schematically in the figures. User system 110, application software system 130, data store 140, and recommendation generator 105 are shown as separate elements in FIG. 2 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Figure 3:
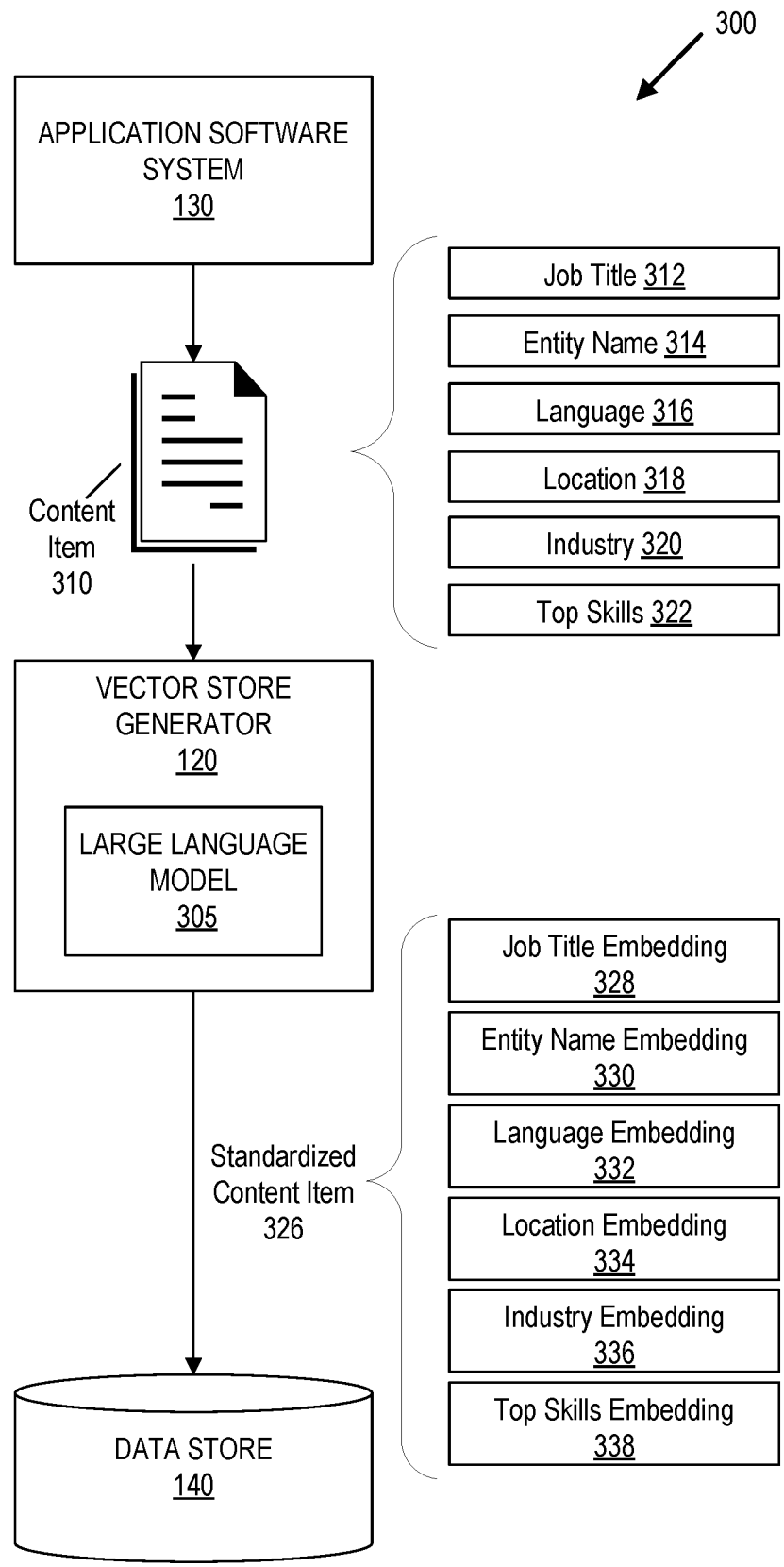
FIG. 3 illustrates an example recommendation regeneration system that includes a vector store generator in accordance with some embodiments of the present disclosure.

FIG. 3 illustrates an example computing system 300 in accordance with some embodiments of the present disclosure. As shown in FIG. 3, application software system 130 sends content item 310 to vector store generator 120. Specifically, application software system 130 sends content item 310 with content item categories including job title 312, entity name 314, language 316, location 318, industry 320, and top skills 322. Although content item 310 is illustrated as including content item categories 312, 314, 316, 318, 320, and 322, in some embodiments, content item 310 includes only some of content item categories 312, 314, 316, 318, 320, and 322. Additionally, although only content item categories 312, 314, 316, 318, 320, and 322 are explicitly illustrated, in some embodiments content item 310 includes additional content item categories. For example, content item 310 can include experience level, country, market area, and/or standardized job title categories.

In some embodiments, content item 310 is generated by application software system 130 in response to a user interacting with application software system 130. For example, a user can interact with application software system 130 to create a job post (e.g., content item 310) on a social graph network. Job title 312 is therefore the title of the job featured in the job post. Similarly, entity name 314 is the name of the entity posting the job and/or an entity represented by the job post. For example, entity name 314 can refer to the name of a company posting a job offering and/or the name of the company hiring for the job post. Language 316 is the language of the job post. In some embodiments, language 316 includes multiple values if different languages are included in the job post.

In some embodiments, application software system 130 determines language 316 based on the text of the job post. For example, application software system 130 determines that language 316 is English in response to determining that content item 310 includes English text. Location 318 is the location of the job posting. For example, location 318 can include a city and/or country where the job is being offered. In some embodiments, location can include an indicator that the associated job posting is available for remote work.

In some embodiments, application software system 130 determines location 318 based on language 316. For example, application software system 130 determines that location 318 is Romania for a job post with language 316 of Romanian. In some embodiments, location 318 includes a metropolitan area. For example, location 318 includes the San Francisco Bay Area. Industry 320 is an industry for the job post. For example, industry 320 can include entertainment providers. Top skills 322 are skills associated with the job post. For example, top skills for a job posting for a marketing position can include marketing and digital marketing.

In some embodiments, content item 310 includes career path information. For example, job title 312 of content item 310 can be associated with one or more previous job titles and future job titles. Vector store generator 120 is configured to generate an embedding for content item 310 including this career path trajectory information. This allows recommendation generator 105 to suggest jobs to a user other than jobs with the same job title as the user's current position. For example, recommendation generator 105 can suggest a content item with a job title indicating a senior level position even though user input 106 indicates that a user is in a junior level position by using the career path information.

Vector store generator 120 receives content item 310 from application software system 130 and determines standardized content item 326. For example, vector store generator 120 applies large language model 305 to content item 310 to generate standardized content item 326. In some embodiments, large language model 305 is an embedding model trained to generate a vector representation (e.g., embedding) for inputs based on the semantic characteristics of the input. For example, large language model 305 is trained on natural language data to understand the semantic correlations between words and ideas. Large language model 305 is therefore able to generate embeddings with shorter distances in the embedded vector space for words and ideas that are similar and/or likely to be used in coordination. For example, large language model 305 generates embeddings with a shorter distance in the embedded vector space for similar words like "car," "van," and "driving" than for dissimilar words like "pelican," "ameliorating," and "Kazakhstan."

In some embodiments, vector store generator 120 applies large language model 305 to each of job title 312, entity name 314, language 316, location 318, industry 320, and top skills 322 to generate job title embedding 328, entity name embedding 330, language embedding 332, location embedding 334, industry embedding 336, and top skills embedding 338, respectively. For example, vector store generator 120 determines standardized content item 326 as a matrix where each of the rows of the matrix are embedded vectors 328, 330, 332, 334, 336, and 338 generated by applying large language model 305 to each of job title 312, entity name 314, language 316, location 318, industry 320, and top skills 322.

In some embodiments, standardized content item 326 includes indices identifying the content item category of the associated embedding. For example, standardized content item 326 includes an index identifying job title embedding 328 as a job title embedding. Vector store generator 120 sends standardized content item 326 to data store 140.

In some embodiments, large language model 305 generates each of content item embeddings 328, 330, 332, 334, 336, and 338 based on the semantic meaning of the respective content item category (e.g., content item categories 312, 314, 316, 318, 320, and 322). For example, vector store generator 120 generates embeddings 328, 330, 332, 334, 336, and 338 where similar words and phrases are close in the vector space created by large language model 305.

In some embodiments, large language model 305 is trained for a specific task. For example, large language model 305 is trained to generate job title suggestions. In such an embodiments, large language model 305 is trained based on content item categories for the relevant task. For example, large language model 305 is trained on content item categories job title 312, entity name 314, language 316, location 318, industry 320, and top skills 322 for generating job title suggestions. As an alternative example, a task can include generating recommendations for adding content to a profile of a social graph network based on a resume (e.g., user input 106), wherein the content item categories include input categories for a profile (e.g., header, about me, etc.). Other examples of tasks include standardization by generating content item categories using other content item categories. For example, inferring an industry and/or based on job title and/or entity name. Another example of a task includes suggesting recommendations for entities to follow on a social graph network based on limited user data. For example, recommendation generator 105 can generate supplemental text for a user with limited profile data and generate a relevant recommendation for the user based on the supplemental text.

Figure 4:
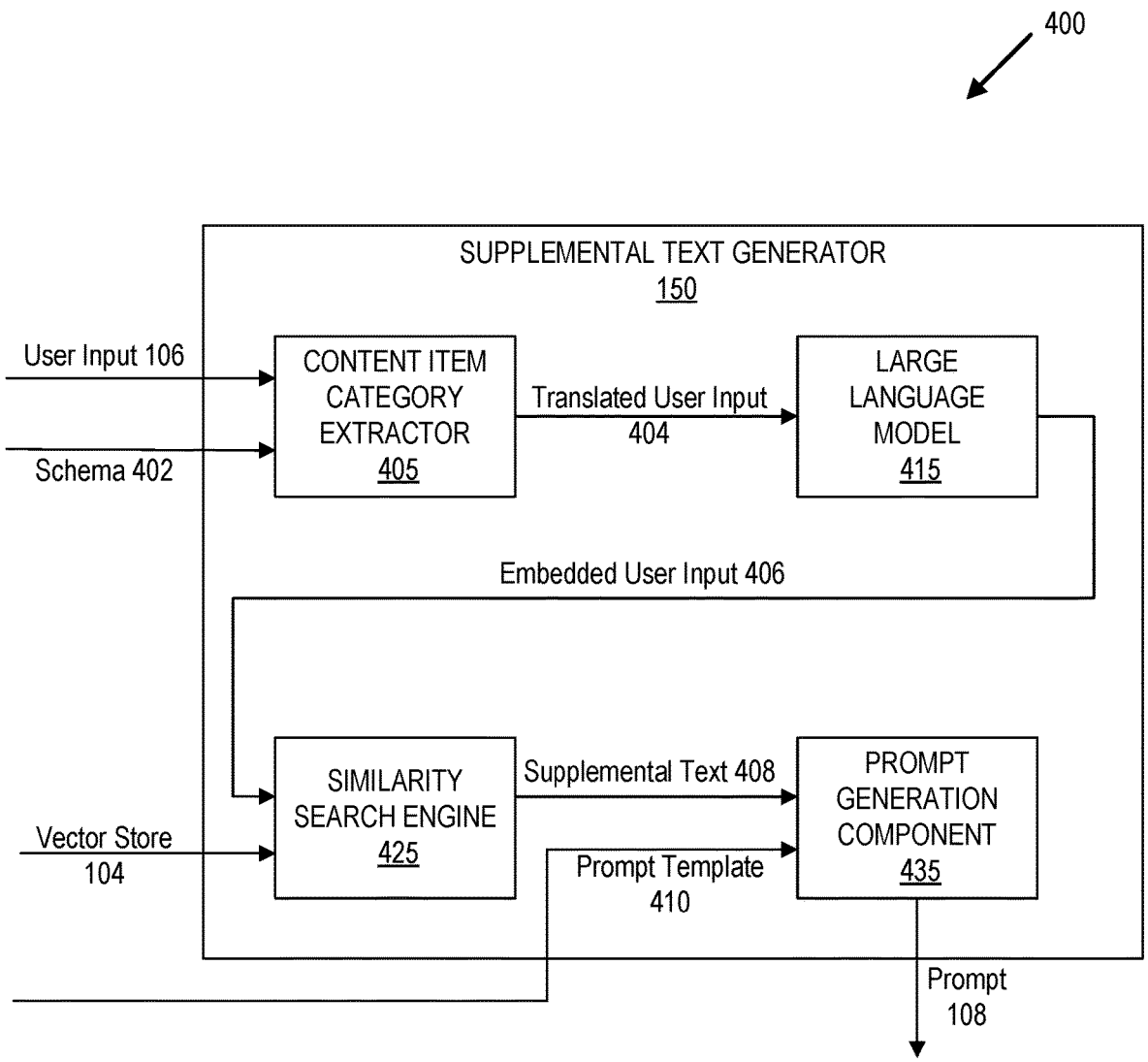
FIG. 4 illustrates an example recommendation regeneration system that includes a supplemental text generator in accordance with some embodiments of the present disclosure.

FIG. 4 illustrates an example computing system 400 in accordance with some embodiments of the present disclosure. As shown in FIG. 4, computing system 400 includes supplemental text generator 150 includes content item category extractor 405, large language model 415, similarity search engine 425, and prompt generation component 435.

As shown in FIG. 4, content item category extractor 405 receives user input 106 and schema 402. Content item category extractor 405 receives user input 106 from a user system (e.g., user system 110 of FIG. 1). In some embodiments, content item category extractor 405 receives schema 402 from an application software system (e.g., application software system 130 of FIG. 1). In some embodiments, content item category extractor 405 receives schema 402 from a data store (e.g., data store 140 of FIG. 1). Schema 402 includes information about the content item categories (e.g., content item categories 314, 314, 316, 318, 320, and 322 of FIG. 3). For example, schema 402 can include examples of user input and associated content item categories extracted from the user input. The user input may be in an unstructured format.

Content item category extractor 405 uses schema 402 to translate user input 106 into translated user input 404 based on content item categories of user input 106 determined by content item category extractor 405. For example, content item category extractor 405 may use a schema 402 including example text: "I'm looking for a digital marketing job in Austin" and associated content item categories: "language: English, location: Austin, TX, industry: entertainment providers, skills: marketing, digital marketing." Continuing with the same example, user input 106 may include text: "I like drawing and I want to work in US west coast." Using schema 402 and user input 106, content item category extractor 405 generates translated user input 404 including content item category information extracted from user input 106. For example, translated user input 404 includes content item categories: "language: English, location: West Coast, USA, skills: illustrating, drawing." In some embodiments, supplemental text generator 150 does not generate translated user input 404 and inputs user input 106 directly into large language model 415.

Content item category extractor 405 sends translated user input 404 to large language model 415. In some embodiments, large language model 415 is a large language machine learning model configured to generate embeddings for text based on the semantic meaning of the text. In some embodiments, large language model 415 is the same large language model as large language model 305 of FIG. 3. Large language model 415 generates an embedded user input 406 including an embedding for each of the content item categories in translated user input 404. For example, embedded user input 406 includes the embedded representation of "English, West Coast, USA, illustrating, and drawing."

In some embodiments, embedded user input 406 includes indices identifying the content item category for the embeddings. For example, embedded user input 406 includes an index designating language with the embedding for "English," an index designating location with the embedding for "West Coast, USA," etc. Large language model 415 sends embedded user input 406 to similarity search engine 425.

Similarity search engine 425 receives embedded user input 406 and vector store 104 and generates supplemental text 408. For example, similarity search engine 425 receives embedded user input 406 from large language model 415 and vector store 104 from a data store (e.g., data store 140 of FIG. 1). In some embodiments, similarity search engine 425 performs a similarity search on embedded user input 406 and vector store 104 and generates top results including the content items with standardized content items most similar to embedded user input 406. For example, similarity search engine 425 uses the indices of embedded user input 406 to find standardized content items with location embeddings that are similar to the embedding for "West Coast, USA." For example, the embeddings for Los Angeles, San Francisco, and/or Seattle are semantically similar to "West Coast, USA" and therefore close to the embedding for "West Coast, USA" in the embedded vector space. Similarity search engine 425 can therefore determine supplemental text 408 as the content items with embedded content item categories most similar to the embedded content item categories of embedded user input 406.

In some embodiments, similarity search engine 425 performs a nearest neighbor search of vector store 104 using embedded user input 406. Although explained with reference to a single content item categories, similarity search engine 425 can perform a similarity search for the entirety of embedded user input 406. For example, embedded user input 406 is a matrix with rows represented by content item categories and each of the standardized content items of vector store 104 are matrices with rows represented by the same content item categories. Similarity search engine 425 can thereby perform a nearest neighbor search to determine supplemental text 408 as content items that are the most semantically similar to embedded user input 406 for all content item categories. Similarity search engine 425 sends supplemental text 408 to prompt generation component 435.

Prompt generation component 435 receives supplemental text 408 and prompt template 410 and creates prompt 108. For example, similarity search engine 425 receives supplemental text 408 from similarity search engine 425. In some embodiments, prompt generation component 435 receives prompt template 410 from an application software system (e.g., application software system 130 of FIG. 1). In some embodiments, prompt generation component 435 receives prompt template 410 from a data store (e.g., data store 140 of FIG. 1).

In some embodiments, prompt template 410 is a template including predetermined text used to generate prompt 108 as explained with reference to FIG. 1. Prompt generation component 435 generates prompt 108 based on supplemental text 408 and prompt template 410. In some embodiments, prompt 108 is a combination of supplemental text 408 and prompt template 410. In some embodiments, supplemental text generator 150 sends prompt to a generative language model (e.g., generative language model 160 of FIG. 1).

Figure 5:
FIG. 5 illustrates an example graphical user interface in accordance with some embodiments of the present disclosure.

FIG. 5 illustrates an example graphical user interface 500 in accordance with some embodiments of the present disclosure. As shown in FIG. 5, graphical user interface 500 includes a job alert interface 505 and recommendation generation button 510. Users of graphical user interface 500 who do not know a job title or location that they want to enter into job alert interface 505, can interact with recommendation generation button 510. In response to receiving a user input of a selection of recommendation generation button 510, graphical user interface 500 updates and enters into a recommendation generation interface as shown in FIG. 6. In some embodiments, graphical user interface 500 is implemented on a client device such as user interface 112 of user system 110.

FIG. 6 illustrates an example graphical user interface 500 in accordance with some embodiments of the present disclosure. In response to a user selecting recommendation generation button 510 of FIG. 5, graphical user interface 500 updates to display text input interface 605. A user of graphical user interface 500 can interact with text input interface 605 to enter text, causing the text to be sent to a recommendation generator as user input. For example, a user interacting with text input interface 605 to enter text and interacting with next button 610, causes the user system to send user input (e.g., user input 106 of FIG. 1) to a recommendation generator (e.g., recommendation generator 105 of FIG. 1). In response to a user interacting with text input interface 605, graphical user interface 500 updates as shown in FIG. 7.

FIG. 7 illustrates an example graphical user interface 500 in accordance with some embodiments of the present disclosure. As shown in FIG. 7, a user of graphical user interface 500 interacted with text input interface 605 to cause text input interface 605 to include the text input "I want to help people in India." In response to a user interacting with next button 610, graphical user interface 500 updates as shown in FIG. 8.

FIG. 8 illustrates an example graphical user interface 500 in accordance with some embodiments of the present disclosure. In response to receiving a user input of a selection of next button 610, graphical user interface 500 updates to display suggested job titles 805 and suggested job locations 810. As shown in FIG. 8, suggested job titles 805 include potential job titles for a user of user interface 500. For example, in response to receiving the text input "I want to help people in India," user system 110 sends user input 106 to recommendation generator 105. Recommendation generator 105 generates standardized recommendations 116 (e.g., suggested job titles 805 and suggested job locations 810).

In some embodiments, in response to a user interacting with job alert submission button 815, application software system 130 creates a job alert for the standardized recommendations 116 shown in FIG. 8. For example, application software system 130 creates a job alert to alert a user of graphical user interface 500 about jobs with job titles similar to the suggested job titles 805 and locations similar to suggested job locations 810.

Figure 9:
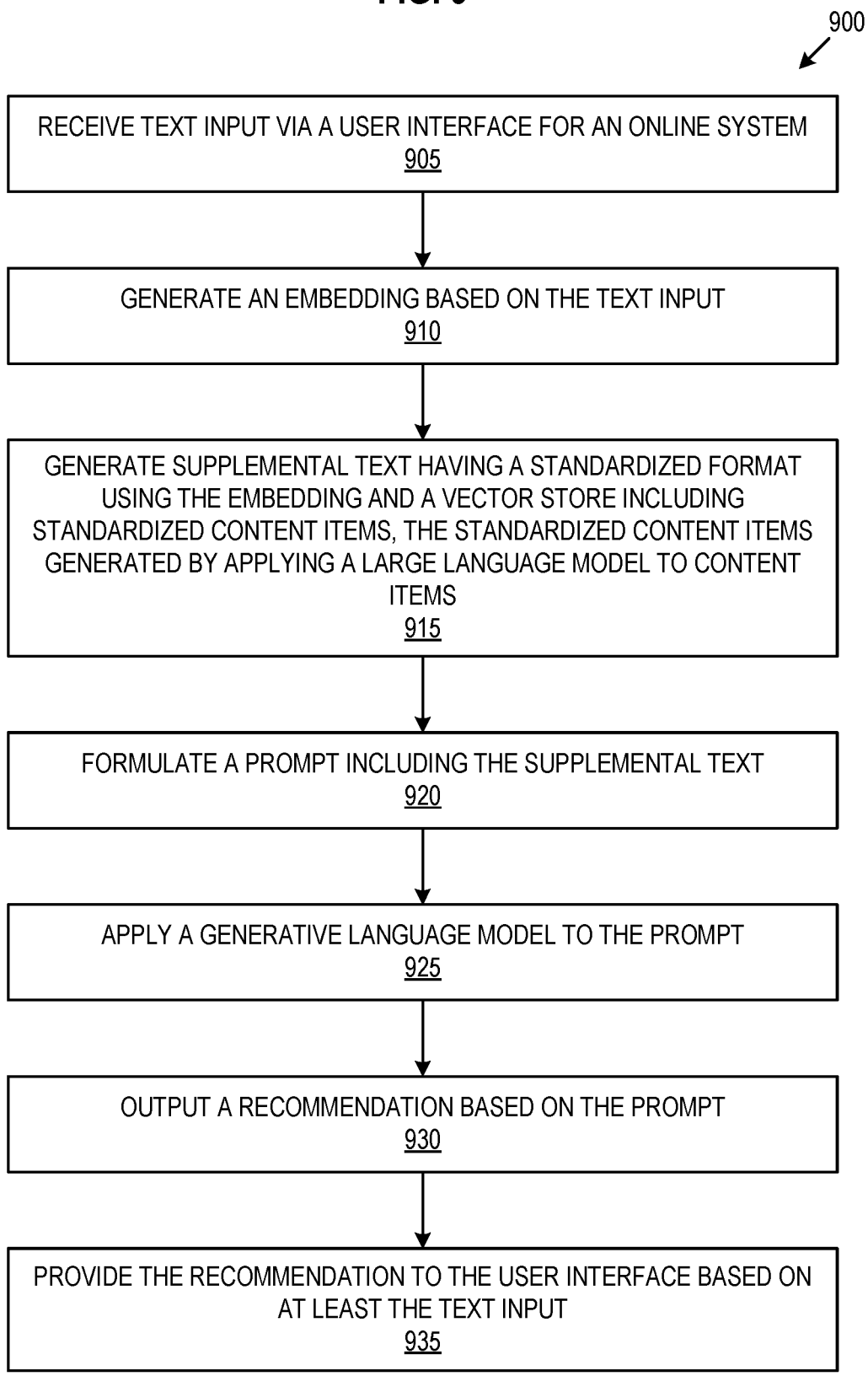
FIG. 9 is a flow diagram of an example method to generate recommendations using user input in accordance with some embodiments of the present disclosure.

FIG. 9 is a flow diagram of an example method 900 to generate recommendations, in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by recommendation generator 105 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 905, the processing device receives text input via a user interface for an online system. For example, a user interacts with a text box as shown in FIG. 7 and generates a text input. The application software system 130, executing on user system 110, sends the text input to recommendation generator 105 as user input 106. Further details with regard to receiving text input via a user interface are discussed with reference to FIGS. 1 and 5-8.

At operation 910, the processing device generates an embedding based on the text input. For example, supplemental text generator 150 receives user input 106 including the text input via the user interface and receives vector store 104 from data store 140. In some embodiments, content item category extractor 405 of supplemental text generator 150 receives the user input 106 including the text input as well as schema 402. Content item category extractor 405 determines translated user input 404 based on the user input 106 and schema 402. In some embodiments, content item category extractor 405 determines translated user input 404 based on content item categories extracted from user input 106 based on schema 402. For example, content item category extractor 405 is trained on schema 402 to identify content item categories in user input 106 and content item category extractor 405 determines translated user input 404 based on content item categories identified in user input 106.

In some embodiments, the processing device generates an embedding by applying a large language model to the user input. For example, supplemental text generator 150 applies large language model 415 to user input 106 and/or translated user input 404 to generate an embedding based on user input 106 (e.g., embedded user input 406). In some embodiments, embedded user input 406 is a matrix where the rows of the matrix represent embedding vectors for the content item categories of user input 106. Further details with regard to generating an embedding based on text input are discussed with reference to FIGS. 1 and 4.

At operation 915, the processing device generates supplemental text having a standardized format using the embedding and a vector store include standardized content items. In some embodiments, the standardized content items are generated by applying a large language model to content items. For example, application software system 130 sends content items (e.g., content item 310 of FIG. 3) to vector store generator 120. Vector store generator 120 generates standardized content items (e.g., standardized content item 326) by applying large language model 305 to the content items. In some embodiments, the processing device uses the same large language model to both generate the embedding for the user input and to generate the standardized content items from the content items. In some embodiments, vector store generator 120 stores the standardized content items in a data store (e.g., data store 140 of FIG. 1).

The processing device generates the supplemental text using the embedding generated at operation 910. For example, similarity search engine 425 generated supplemental text 408 using embedded user input 406 and vector store 104. In some embodiments, similarity search engine 425 generates supplemental text 408 by performing a similarity search on embedded user input 406 and vector store 104. For example, similarity search engine 425 performs a nearest neighbors search to determine the content items in vector store 104 that are semantically most similar to user input 106. In some embodiments, supplemental text 408 includes a list of the content items that are most similar to user input 106. For example, supplemental text 408 includes the top fifteen job postings that are most semantically similar to user input 106. Further details with regard to generating supplemental text having a standardized format are discussed with reference to FIGS. 1 and 3-4.

At operation 920, the processing device formulates a prompt including the supplemental text. For example, prompt generation component 435 formulates prompt 108 based on supplemental text 408. In some embodiments, the processing device also uses a prompt template to formulate the prompt. For example, prompt generation component 435 formulates prompt 108 using both supplemental text 408 and prompt template 410. Further details with regard to formulating a prompt including the supplemental text are discussed with reference to FIGS. 1 and 4.

At operation 925, the processing device applies a generative language model to the prompt. For example, recommendation generator 105 applies generative language model 160 to prompt 108 causing generative language model 160 to generate recommendations 114 based on the prompt 108. Further details with regard to applying a generative language model to the prompt are discussed with reference to FIG. 1.

At operation 930, the processing device outputs a recommendation based on the prompt. For example, generative language model 160 generates recommendations 114 based on prompt 108. In some embodiments, generative language model 160 sends recommendations 114 to recommendation verification component 170 and recommendation verification component 170 determines standardized recommendations 116 based on recommendations 114. For example, recommendation verification component 170 compares recommendations 114 to a list of standardized recommendations (e.g., a list of standardized job titles) and determines standardized recommendations 116 as the recommendations included in both recommendations 114 and the list of standardized recommendations. Further details with regard to outputting a recommendation are discussed with reference to FIG. 1.

At operation 935, the processing device provides the recommendation to the user interface based on at least the text input. For example, recommendation generator 105 sends the recommendation to user system 110 via application software system 130. Application software system 130 presents suggested job titles 805 and suggested job locations 810 on user interface 112 of user system 110. Further details with regard to providing the recommendation are discussed with reference to FIGS. 1 and 8.

Figure 10:
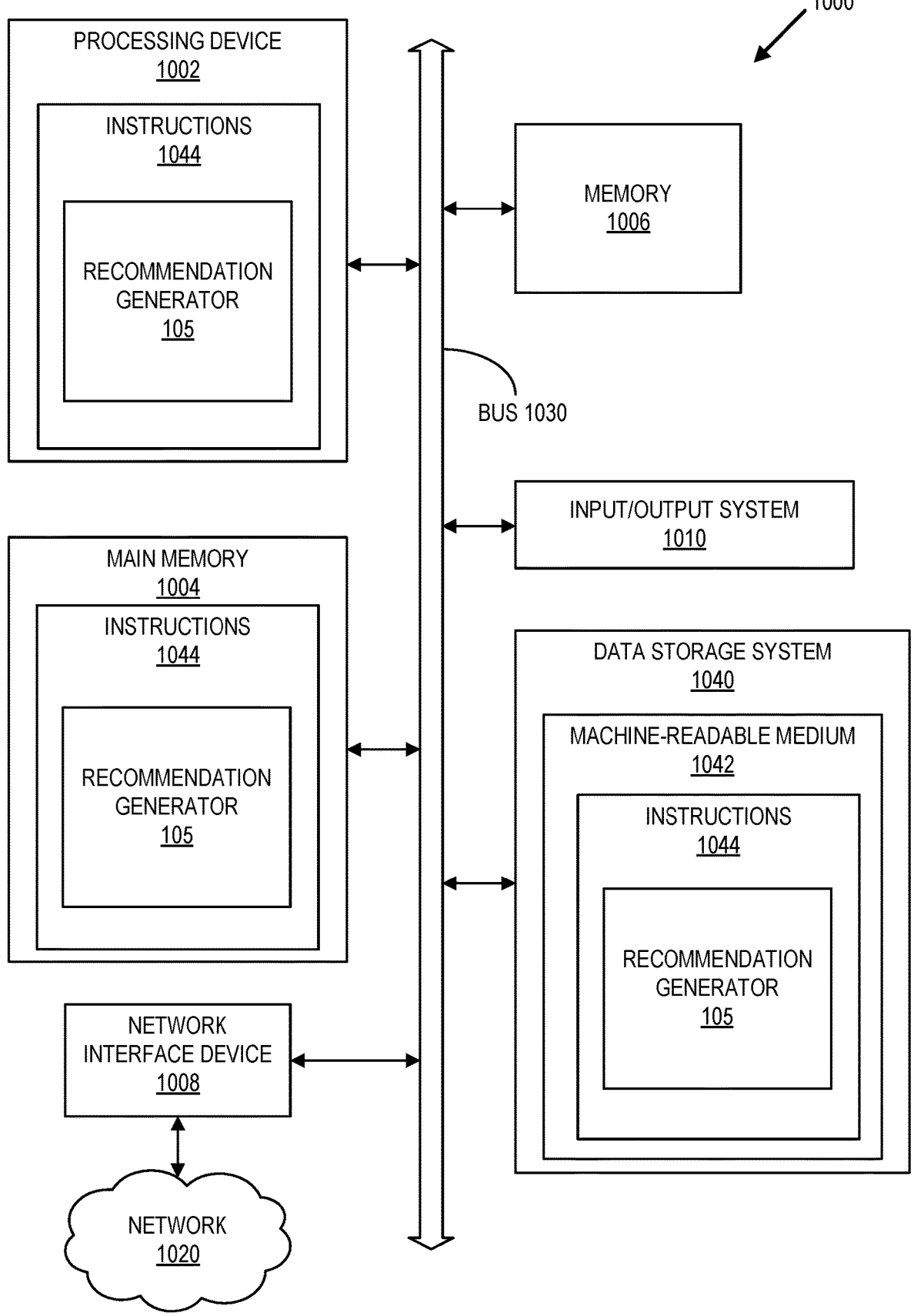
FIG. 10 is a block diagram of an example computer system in which embodiments of the present disclosure can operate.

FIG. 10 illustrates an example machine of a computer system 1000 within which a set of instructions, for causing the machine to perform any one or more of the methodologies discussed herein, can be executed. In some embodiments, the computer system 1000 can correspond to a component of a networked computer system (e.g., the computer system 100 of FIG. 1) that includes, is coupled to, or utilizes a machine to execute an operating system to perform operations corresponding to recommendation generator 105 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random-access memory (DRAM) such as synchronous DRAM (SDRAM) or Rambus DRAM (RDRAM), etc.), a memory 1006 (e.g., flash memory, static random-access memory (SRAM), etc.), an input/output system 1010, and a data storage system 1040, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1044 for performing the operations and steps discussed herein.

The computer system 1000 can further include a network interface device 1008 to communicate over the network 1020. Network interface device 1008 can provide a two-way data communication coupling to a network. For example, network interface device 1008 can be an integrated-services digital network (ISDN) card, cable modem, satellite modem, or a modem to provide a data communication connection to a corresponding type of telephone line. As another example, network interface device 1008 can be a local area network (LAN) card to provide a data communication connection to a compatible LAN. Wireless links can also be implemented. In any such implementation network interface device 1008 can send and receive electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 1000.

Computer system 1000 can send messages and receive data, including program code, through the network(s) and network interface device 1008. In the Internet example, a server can transmit a requested code for an application program through the Internet and network interface device 1008. The received code can be executed by processing device 1002 as it is received, and/or stored in data storage system 1040, or other non-volatile storage for later execution.

The input/output system 1010 can include an output device, such as a display, for example a liquid crystal display (LCD) or a touchscreen display, for displaying information to a computer user, or a speaker, a haptic device, or another form of output device. The input/output system 1010 can include an input device, for example, alphanumeric keys and other keys configured for communicating information and command selections to processing device 1002. An input device can, alternatively or in addition, include a cursor control, such as a mouse, a trackball, or cursor direction keys for communicating direction information and command selections to processing device 1002 and for controlling cursor movement on a display. An input device can, alternatively or in addition, include a microphone, a sensor, or an array of sensors, for communicating sensed information to processing device 1002. Sensed information can include voice commands, audio signals, geographic location information, and/or digital imagery, for example.

The data storage system 1040 can include a machine-readable storage medium 1042 (also known as a computer-readable medium) on which is stored one or more sets of instructions 1044 or software embodying any one or more of the methodologies or functions described herein. The instructions 1044 can also reside, completely or at least partially, within the main memory 1004 and/or within the processing device 1002 during execution thereof by the computer system 1000, the main memory 1004 and the processing device 1002 also constituting machine-readable storage media.

In one embodiment, the instructions 1044 include instructions to implement functionality corresponding to a recommendation generator (e.g., recommendation generator 105 of FIG. 1). While the machine-readable storage medium 1042 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

An example 1 includes a method including receiving text input via a user interface for an online system; generating an embedding based on the text input; generating supplemental text having a standardized format using the embedding and a vector store including standardized content items, where the standardized content items are generated by applying a large language model to content items; formulating a prompt including the supplemental text; applying a generative language model to the prompt; outputting, by the generative language model, based on the prompt, a recommendation; and providing the recommendation to the user interface based on at least the text input.

An example 2 includes the subject matter of example 1, further including performing a similarity search on the embedding and the standardized content items, where generating the supplemental text is based on a similarity of the embedding and a standardized content item of the standardized content items. An example 3 includes the subject matter of example 2, where the standardized content item includes a content item categories and where generating the embedding includes determining the embedding based on a content item category of the content item categories. An example 4 includes the subject matter of any of examples 1-3, where the text input is unstructured data not in the standardized format and wherein the plurality of standardized content items are in the standardized format. An example 5 includes the subject matter of any of examples 3 and 4, where the content items include a job postings and where the content item categories include at least one of a job title, an entity name, a job language, a job location, a job industry, and skills associated with a job. An example 6 includes the subject matter of any of claims 3-5, where performing the similarity search includes determining the standardized content item of the standardized content items based on a similarity of the embedding and the standardized content item for the content item category. An example 7 includes the subject matter of example 6, where generating the supplemental text further includes generating the supplemental text based on data of the standardized content item for a second content item category. An example 8 includes the subject matter of any of examples 1-7, where generating the embedding based on the text input includes applying a large language model to the text input to create the embedding. An example 9 includes the subject matter of any of examples 1-8, further including matching the recommendation with a standardized recommendation of a plurality of standardized recommendations, where providing the recommendation to the user interface is in response to matching the recommendation with the standardized recommendation. An example 10 includes the subject matter of any of claims 1-9, where providing the recommendation includes providing the recommendation to a recommendation system for a task, where the large language model is trained based on the task. An example 11 includes the subject matter of example 10, where the generative language model is finetuned based on the task.

An example 12 includes a system including at least one memory device; and a processing device, operatively coupled with the at least one memory device, to: receive text input via a user interface for an online system; generate an embedding based on the text input; generate supplemental text having a standardized format using the embedding and a vector store including standardized content items, where the standardized content items are generated by applying a large language model to content items; formulate a prompt including the supplemental text; apply a generative language model to the prompt; output, by the generative language model, based on the prompt, a recommendation; and provide the recommendation to the user interface based on at least the text input.

An example 13 includes the subject matter of example 12, where the processing device is further to: perform a similarity search on the embedding and the standardized content items, where generating the supplemental text is based on a similarity of the embedding and a standardized content item of the standardized content items. An example 14 includes the subject matter of example 13, where the standardized content item includes a content item categories and where generating the embedding includes determining the embedding based on a content item category of the content item categories. An example 15 includes the subject matter of any of examples 12-14, where the text input is unstructured data not in the standardized format and wherein the plurality of standardized content items are in the standardized format. An example 16 includes the subject matter of any of examples 14 and 15, where the content items include job postings and where the content item categories include at least one of a job title, an entity name, a job language, a job location, a job industry, and skills associated with a job. An example 17 includes the subject matter of any of examples 14-16, where performing the similarity search includes determining the standardized content item of the standardized content items based on a similarity of the embedding and the standardized content item for the content item category. An example 18 includes the subject matter of example 17, where generating the supplemental text further includes generating the supplemental text based on data of the standardized content item for a second content item category. An example 19 includes the subject matter of any of examples 12-18, where generating the embedding based on the text input includes applying a large language model to the text input to create the embedding.

An example 20 includes system including: at least one memory device; and a processing device, operatively coupled with the at least one memory device, to: receive text input via a user interface for an online system; generate an embedding based on the text input by applying a first large language model to the text input; perform a similarity search on the embedding and standardized content items, wherein the standardized content items are generated by applying a second large language model to content items; generate supplemental text having a standardized format based on a similarity of the embedding and a standardized content item of the standardized content items; formulate a prompt including the supplemental text; apply a generative language model to the prompt; output, by the generative language model, based on the prompt, a recommendation; and provide the recommendation to the user interface based on at least the text input.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method 900 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving text input via a user interface for an online system, wherein the received text input is unstructured data;
generating translated user input using the text input and a schema, wherein the schema comprises example text and associated content item categories;
generating an embedding of a content item category in the translated user input;
generating supplemental text having a standardized format using the embedding and a vector store comprising a plurality of standardized content items, wherein the plurality of standardized content items are generated by applying a large language model to a plurality of content items, wherein the plurality of standardized content items are in the standardized format;
formulating a prompt comprising the supplemental text;
applying a generative language model to the prompt;
outputting, by the generative language model, based on the prompt, a recommendation that conforms to a taxonomy based on the plurality of content items; and
providing the recommendation to the user interface based on at least the text input.

2. The method of claim 1, further comprising:
performing a similarity search on the embedding and the plurality of standardized content items, wherein generating the supplemental text is based on a similarity of the embedding and a standardized content item of the plurality of standardized content items.

3. The method of claim 2, wherein the standardized content item includes a plurality of content item categories and wherein generating the embedding comprises determining the embedding based on a content item category of the plurality of content item categories.

4. The method of claim 1, wherein the text input is not in the standardized format.

5. The method of claim 3, wherein the plurality of content items include a plurality of job postings and wherein the plurality of content item categories comprise at least one of a job title, an entity name, a job language, a job location, a job industry, or skills associated with a job.

6. The method of claim 3, wherein performing the similarity search comprises:
determining the standardized content item of the plurality of standardized content items based on a similarity of the embedding and the standardized content item for the content item category.

7. The method of claim 6, wherein generating the supplemental text further comprises:
generating the supplemental text based on data of the standardized content item for a second content item category.

8. The method of claim 1, wherein generating the embedding based on the text input comprises applying a large language model to the text input to create the embedding.

9. The method of claim 1, further comprising:
matching the recommendation with a standardized recommendation of a plurality of standardized recommendations, wherein providing the recommendation to the user interface is in response to matching the recommendation with the standardized recommendation.

10. The method of claim 1, wherein providing the recommendation comprises:
providing the recommendation to a recommendation system for a task, wherein the large language model is trained based on the task.

11. The method of claim 10, wherein the generative language model is finetuned based on the task.

12. A system comprising:
at least one memory device; and
a processing device, operatively coupled with the at least one memory device, to:
receive text input via a user interface for an online system, wherein the received text input is unstructured data;
generate translated user input using the text input and a schema, wherein the schema comprises example text and associated content item categories;
generate an embedding of a content item category in the translated user input;
generate supplemental text having a standardized format using the embedding and a vector store comprising a plurality of standardized content items, wherein the plurality of standardized content items are generated by applying a large language model to a plurality of content items, wherein the plurality of standardized content items are in the standardized format;
formulate a prompt comprising the supplemental text;
apply a generative language model to the prompt;
output, by the generative language model, based on the prompt, a recommendation that conforms to a taxonomy based on the plurality of content items; and
provide the recommendation to the user interface based on at least the text input.

13. The system of claim 12, wherein the processing device is further to:
perform a similarity search on the embedding and the plurality of standardized content items, wherein generating the supplemental text is based on a similarity of the embedding and a standardized content item of the plurality of standardized content items.

14. The system of claim 13, wherein the standardized content item includes a plurality of content item categories and wherein generating the embedding comprises determining the embedding based on a content item category of the plurality of content item categories.

15. The system of claim 12, wherein the text input is unstructured data not in the standardized format.

16. The system of claim 14, wherein the plurality of content items include a plurality of job postings and wherein the plurality of content item categories comprise at least one of a job title, an entity name, a job language, a job location, a job industry, and skills associated with a job.

17. The system of claim 14, wherein performing the similarity search comprises:

determining the standardized content item of the plurality of standardized content items based on a similarity of the embedding and the standardized content item for the content item category.

18. The system of claim 17, wherein generating the supplemental text further comprises:

generating the supplemental text based on data of the standardized content item for a second content item category.

19. The system of claim 12, wherein generating the embedding based on the text input comprises applying a large language model to the text input to create the embedding.

20. A non-transitory computer readable medium comprising instructions that when executed by a processing device cause the processing device to:

receive text input via a user interface for an online system, wherein the received text input is unstructured data;

generate translated user input using the text input and a schema, wherein the schema comprises example text and associated content item categories;

generate an embedding of a content item category in the translated user input;

generate supplemental text having a standardized format using the embedding and a vector store comprising a plurality of standardized content items, wherein the plurality of standardized content items are generated by applying a large language model to a plurality of content items, wherein the plurality of standardized content items are in the standardized format;

formulate a prompt comprising the supplemental text;

apply a generative language model to the prompt;

output, by the generative language model, based on the prompt, a recommendation that conforms to a taxonomy based on the plurality of content items; and provide the recommendation to the user interface based on at least the text input.

* * * * *